June 19, 1945.   S. B. CRARY   2,378,752
ELECTRIC POWER TRANSMISSION SYSTEM
Filed Oct. 12, 1943
Fig.1.
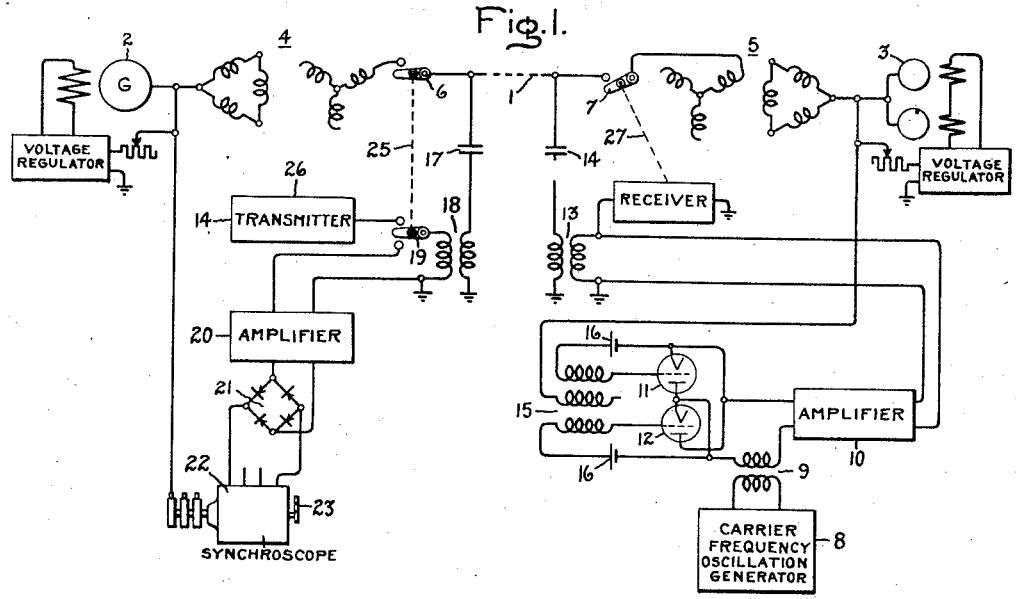
Fig.2.
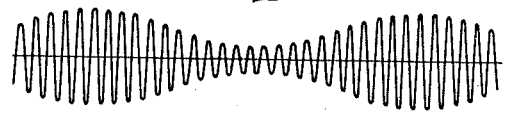
AMPLITUDE MODULATED CARRIER SIGNAL
Fig.3.
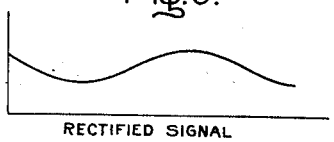
RECTIFIED SIGNAL
Fig.4.
Fig.5.
CORRECT EXCITATION INITIALLY
WITH -- AND WITHOUT -- REGULATORS
Inventor:
Selden B. Crary,
by Harry E. Dunham
His Attorney.

Patented June 19, 1945

2,378,752

UNITED STATES PATENT OFFICE 2,378,752

ELECTRIC POWER TRANSMISSION SYSTEM

Selden B. Crary, Schenectady, N. Y., assignor to General Electric Company, a corporation of New York Application October 12, 1943, Serial No. 505,956

9 Claims. (Cl. 171—118)

This invention relates to electric power transmission and more particularly to a new and improved method and appartus for charging a long synchronous-to-synchronous power transmission line.

As its name implies, a synchronous-to-synchronous power transmission line is one which interconnects synchronous dynamo-electric machines at its ends. Such a line usually operates at essentially a constant voltage and it is well known that its charging current is proportional to its length and voltage. The longest, highest voltage lines have such a high charging current that it is either necessary to provide specially large generators for supplying this charging current or else it is necessary to operate two or more generators in parallel in order to supply the charging current. For example, when charging a long line which interconnects a large metropolitan power system and a remote generating station, typically a hydro station, it is sometimes necessary to start at least two hydro alternators in order to hold down the voltage and current when charging the line even though one unit will supply all the power necessary to supply the station. The line is first connected to the station generators while they are unexcited and have merely their residual voltage. The line charging current excites them and raises their voltage. The equalization of the voltages of the line and system prior to their interconnection is accomplished by field control of the station generators. It is not usually practical to charge the line from the system because its voltage must be maintained at normal or rated value so that if the uncharged line were thrown on the system there would be a highly objectionable rise in system and line voltage.

In accordance with this invention the necessity of starting up more than one station generator in order to charge the line or the necessity of building oversize generators with high line charging capacity is eliminated. This is accomplished by synchronizing the generators at both ends of the line before they are connected to it, then connecting the station generator to the line and finally connecting the system to the line. The time interval between the two connections should be as short as possible, but their order should not be reversed. It is contemplated that these connections will be substantially simultaneous for all practical purposes. In this manner the line charging current will practically from the beginning be supplied from both ends. Simultaneous closing of the breakers is not essential since the transient or short time line charging ability of the generator is higher than the restrained line charging ability. However, I have found that it is not necessary that there be any shock to the system voltage when the system picks up its share of the line charging current if the voltage of the station is a predetermined amount less than the voltage of the system. This is because the voltage equalizing circulating current in the system will neutralize the system's share of the line charging current. If the voltage of the station is above this predetermined value, there will be a sudden voltage rise on the system, and if the voltage of the station is below this predetermined value, there will be a sudden voltage drop on the system.

An object of the invention is to provide a new and improved method and apparatus for charging a long transmission line.

Another object of the invention is to provide a novel system for synchronizing alternators at both ends of a transmission line while they are all disconnected from the line.

A further object of the invention is to provide a method and apparatus for charging a transmission line from both ends without voltage shock to one end.

The invention wil be better understood from the following description taken in connection with the accompanying drawing and its scope will be pointed out in the appended claims.

In the drawing Fig. 1 illustrates diagrammatically an embodiment of the invention, Figs. 2 and 3 are curves for illustrating the operation of Fig. 1, Fig. 4 is an end view of the synchroscope dial, and Fig. 5 is a set of curves for illustrating the relationship between the system and generator currents during a line charging operation.

Referring now to the drawing and more particularly to Fig. 1, there is shown therein a transmission line 1 for transmitting power between a synchronous generator 2 and a synchronous power system 3. The voltage of the generator is stepped up by a power transformer 4 and the voltage of the line is stepped down by a power transformer 5. The electrical connections between the step-up transformer 4 and the line 1 are controlled by a circuit breaker 6, and the electrical connections between the line 1 and the step-down power transformer 5 are controlled by a circuit breaker 7. The system will ordinarily be a three-phase system and the transformers 4 and 5 are shown as delta-wye and wye-delta transformers respectively. However, as the phases are all similar, the details of only one phase will be described in the interests of simplicity.

A suitable way of synchronizing the generator 2 with the system 3 when the circuit breakers 6 and 7 are open is by means of an amplitude-modulated carrier current signal system. In this system high frequency currents are transmitted by the transmission line conductors and the amplitude of these currents is modulated in accordance with the frequency of the alternator voltage at one end of the line, and compared with the corresponding frequency of the voltage at the other end of the line, in order to determine the phase relation of the voltages. As shown in the drawing, this equipment comprises a carrier frequency oscillation generator 8 of any well-known type which produces high frequency alternating current. This is transformed by a transformer 9 and introduced into the input circuit of an amplifier 10 through a pair of reversely-connected electric valves 11 and 12. The amplified high frequency current output of the amplifier is again transformed by a transformer 13 and is impressed between a phase conductor of line 1 and ground through a coupling capacitor 14 which offers a relatively high reactance to the flow of system frequency current but offers relatively low reactance to the flow of the high frequency carrier currents. The amplitude of the high frequency carrier current signal is modulated in accordance with the frequency of the voltage of the system 3 by controlling the conductivities of the valves 11 and 12 in accordance with this frequency. Thus, the voltage of the system is transformed by a transformer 15 and is impressed on the grid-cathode circuits of the tubes 11 and 12. These grids are normally maintained negative with respect to their cathodes by grid bias potentials such as can be produced by batteries 16. The result is that the amplitude modulated carrier signal impressed on the transmission line has a wave shape similar to that shown in Fig. 2 in which the envelope of the high frequency carrier signal expands and contracts at the same frequency as that of the system 3.

At the generating station end of the transmission line the modulated carrier signal is taken off through a coupling capacitor 17 and a transformer 18. This is fed through a control switch 19 to the input of an amplifier 20 of any suitable type, the output of which is rectified by a rectifier 21 and the rectified current connected between the neutral and one of the terminals of a three-phase star-connected distributed winding of a synchroscope 22 which may be essentially the same as a three-phase wound rotor induction motor or differential selsyn device. The rectified input to the synchroscope 22 will have a time-current relation similar to that shown in Fig. 3 in which there is a direct-current component on which is superposed an alternating wave whose magnitude varies in phase with the voltage of the system 3. The other two phase terminals of the stator of the synchroscope 22 will of course be connected to the rectifiers for the other two phases which correspond to rectifier 21. The synchroscope is preferably designed to have a two-thirds pitch so that the direct-current component from the three phases results in no appreciable resultant rotor flux when the direct-current components are balanced. However, even if there is some unbalance direct current this will only tend to give a sixty-cycle vibration of the synchroscope and will not affect appreciably the rotor position.

The phase terminals of the rotor of the synchroscope 22 are connected respectively to the phase terminals of the generator 2. Therefore, only when the frequencies of the system and the generating station are equal will the synchroscope slip be zero and its rotor be at rest. By providing its rotor with a pointer 23 and its stator with a dial 24 it can readily be determined when the system and generating station voltages are in phase with each other.

In order to insure that the circuit breakers 6 and 7 are closed substantially simultaneously after the voltages at the two ends of the line are synchronized circuit breaker 6 can be mechanically coupled to switch 19 by a linkage 25, the arrangement being such that when circuit breaker 6 is closed switch 19 opens the carrier current signal circuit and closes a circuit between a high frequency oscillation transmitter 26 and the primary winding of transformer 18, this connection being completed through ground. The transmitter signal is then sent back through the coupling transformer 17 and over the line 1 and through the coupling capacitor 14 to the transformer 13 where it is picked up by a receiver which is connected across the secondary winding of the transformer 13. By any suitable electromechanical means which is indicated schematically by 27 the receiver can be made to close the circuit breaker 7. Therefore, the closing of circuit breaker 6 can be made to initiate a train of events which culminates in the closing of the circuit breaker 7.

The substantially simultaneous closure of the circuit breakers 6 and 7 will cause the line 1 to be charged from both ends. If the terminal voltages and reactances at both ends are equal, then both ends will supply one-half the line charging current. Ordinarily, however, the system reactance will be lower than the generating station reactance because the system will have a plurality of parallel-connected machines whereas the generating station will have only one incoming generator with the result that the system will supply more than half the line charging current. On the other hand, if the station generator has a very low voltage, then the wattless circulating current which will be exchanged between the machines as a result of their substantial inequality of voltage will more than cancel the system's share of the charging current and will add to the station's share of the charging current so that there will be a drop in system voltage and a heavy transient overload of the station generator. I have found, however, that if the generating station voltage is equal to the system voltage multiplied by the factor $$\frac{X_C - \frac{X_L}{2} - X_T - X'_g}{X_C}$$

there is practically no transient shock to the system voltage and the generating station in effect initially supplies all the line charging current. In the above factor, $X_C$ is the charging reactance of a uniform line, $$\frac{X_L}{2}$$

is one half the line reactance $X_L$, $X_T$ is the power transformer reactance, and $X'_g$ is the generator transient reactance. The above factor is based on the consideration of the line as an equivalent T circuit. The operation of the invention when the terminal voltages have the above-described relation is shown in Fig. 5 in which current is plotted against time. At time T₁ the circuit breakers 6 and 7 are closed and the curve $I_g$, representing the generating station current, jumps substantially immediately to the full value of normal line charging current and the current $I_s$ of the system neither increases nor decreases. As time goes on the reactance of the generator approaches its synchronous reactance with the result that the current $I_g$ falls off so that the current $I_s$ must increase in order that the sum of the two currents will equal the line charging current. This is shown by the dotted lines. In some instances these currents will cross each other so that in the end the system will supply more than half of the line charging current. If now the equipments at each end of the line are provided with automatic voltage regulators which are adjusted so as to hold equal terminal voltage, as is usually the case, and if these regulators are set into action immediately after the closure of the switches 6 and 7, then the result will be that $I_g$ and $I_s$ will approach each other and will finally end up at equal values corresponding to one-half the line charging current. This is shown by the dot-dash line in Fig. 5.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In a synchronous-to-synchronous power system, the method of charging a long transmission line which comprises, synchronizing the generators at both ends of the line while they are all disconnected from the line, and substantially simultaneously connecting them to the line when they are synchronized.

2. In a synchronous-to-synchronous power system, the method of charging a long transmission line which comprises, synchronizing no more than one generator at one end of the line with a plurality of parallel-connected generators at the other end of the line while all of said generators are disconnected from the line and while said parallel-connected generators have substantial rated terminal voltage, adjusting the effective terminal voltage of the other generator below its rated value and substantially simultaneously connecting said generators to said line at their respective ends of the line.

3. In a synchronous-to-synchronous power transmission system, the method of charging a long transmission line which ordinarily interconnects a generator and a normally operating generating system comprising, synchronizing said generator and generating system while they are both disconnected from said line, adjusting the voltage of said generator to such a value that when it and said generating system are simultaneously connected to opposite ends of said line there will be no shock to the voltage of the generating system, and substantially simultaneously connecting said generator and generating system to opposite ends of said line.

4. In a synchronous-to-synchronous power transmission system, the method of charging a long transmission line which ordinarily interconnects a generator and a normally operating generating system comprising, synchronizing said generator and generating system while they are both disconnected from said line, adjusting the voltage of said generator to such a value that when it and said generating system are substantially simultaneously connected to opposite ends of said line there will be no shock to the voltage of the generating system, substantially simultaneously connecting said generator and generating system to opposite ends of said line, and adjusting the voltage of said generator so as to produce equality between the terminal voltages of said line.

5. In a synchronous-to-synchronous power transmission system, the method of charging a long transmission line which ordinarily interconnects a generator and a normally operating generating system comprising, synchronizing said generator and generating system while they are both disconnected from said line, adjusting the voltage $E_g$ of the generator end of the line so that it is equal to the voltage $E_s$ of the system end of the line multiplied by $$\frac{X_C - \frac{X_L}{2} - X_T - X'_g}{X_C}$$

in which $X_C$ is the charging reactance of a uniform line, $$\frac{X_L}{2}$$

is one half the line reactance $X_L$, $X_T$ is the power transformer reactance, and $X'_g$ is the generator transient reactance, and substantially simultaneously connecting said generator and generating system to opposite ends of said line.

6. In combination, a constant-voltage alternating-current power system including a plurality of parallel-connected synchronous generators, a remote generating station, a long transmission line for delivering power from said station to said system, said station having an alternator which cannot charge said transmission line without producing objectionably high voltages, circuit breakers at each end of said line, means for detecting synchronism of said alternator and said system while said circuit breakers are open at both ends of said line, and means for substantially simultaneously closing said circuit breakers at both ends of said line when said alternator and said system are in synchronism.

7. In combination, a constant-voltage alternating-current power system including a plurality of parallel-connected synchronous generators, a remote generating station, a long transmission line for delivering power from said station to said system, said station having an alternator which cannot charge said transmission line without producing objectionably high voltages, circuit breakers at each end of said line, means including carrier currents transmitted by said line for detecting synchronism of said alternator and said system while said circuit breakers are open at both ends of said line, and means including carrier currents transmitted by said line for substantially simultaneously closing said circuit breakers at both ends of said line when said alternator and said system are in synchronism.

8. In combination, a constant-voltage alternating-current power system including a plurality of parallel-connected synchronous generators, a remote generating station, a long transmission line for delivering power from said station to said system, said station having an alternator which cannot charge said transmission line without producing objectionably high voltages, circuit breakers at each end of said line, means for detecting synchronism of said alternator and said system while said circuit breakers are open at both ends of said line, the voltage of said alternator having such a value that if said circuit breakers are simultaneously closed at both ends of said line there will be no shock to the voltage of said system, and means for substantially simultaneously closing said circuit breakers at both ends of said line when said alternator and said system are in synchronism.

9. In combination, a constant-voltage alternating current power system including a plurality of parallel-connected synchronous generators, a remote generating station, a long transmission line for delivering power from said station to said system, said station having an alternator which cannot charge said transmission line without producing objectionably high voltages, circuit breakers at each end of said line, means including carrier currents transmitted by said line for detecting synchronism of said alternator and said system while said circuit breakers are open at both ends of said line, the voltage of said alternator having such a value that if said circuit breakers are simultaneously closed at both ends of said line when said alternator and said line are in synchronism there will be no shock to the voltage of said system, an automatic voltage regulator for said generator, and means for rendering said regulator active after said circuit breakers are closed to hold the voltage of the generator end of said line at a predetermined value relative to the voltage of the system end of said line.

SELDEN B. CRARY.